June 19, 1928.

Re. 16,998

LE ROY P. CLUTTER

OPERATING MECHANISM FOR EXCAVATOR BUCKETS

Original Filed Feb. 9, 1923 2 Sheets-Sheet 1

Inventor

Le Roy P. Clutter

By G. L. Ely

Attorney

June 19, 1928.
Re. 16,998
LE ROY P. CLUTTER
OPERATING MECHANISM FOR EXCAVATOR BUCKETS
Original Filed Feb. 9, 1923 2 Sheets-Sheet 2
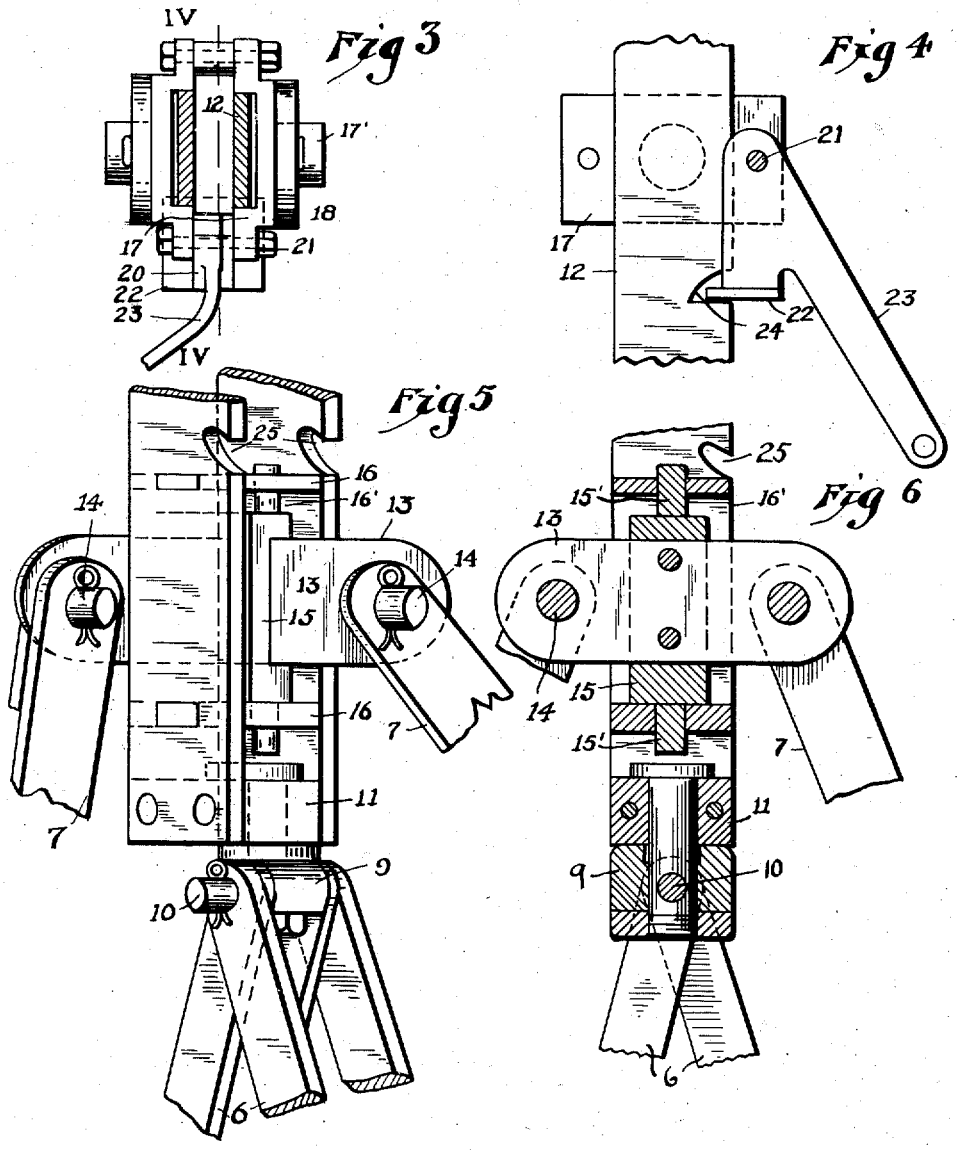
Inventor
Le Roy P. Clutter
By G. R. Ely.
Attorney Reissued June 19, 1928. Re. 16,998

UNITED STATES PATENT OFFICE.

LE ROY P. CLUTTER, OF WASHINGTON, PENNSYLVANIA, ASSIGNOR OF ONE-THIRD TO GEORGE E. WAGNER, OF BEAVER FALLS, PENNSYLVANIA, AND ONE-THIRD TO BIRD C. CLUTTER, OF WASHINGTON, PENNSYLVANIA.

OPERATING MECHANISM FOR EXCAVATOR BUCKETS.

Original No. 1,526,774, dated February 17, 1925, Serial No. 617,976, filed February 9, 1923. Application for reissue filed June 5, 1925. Serial No. 35,239.

This invention relates to certain new and useful improvements in operating mechanism for grab buckets, such as the "clam shell" and "orange peel" types, adapted for use in connection with power excavators and loaders.

The primary objects of the invention are to provide an apparatus of the class stated, which includes a carrier vertically shiftable in the free end of the boom of the power apparatus and constructed to be connected to the boom so that the weight of the boom may be utilized to force the bucket member into the material to be conveyed, thereby assuring a full load at all times and in consequence expediting the work and reducing the cost of attending labor to a minimum; which will be easily and conveniently filled and dumped at any position; which provides novel means for vertically shifting the carrier in the boom end; which includes a bucket member pivotally connected to the carrier to allow its partial rotation thereby permitting of its adjustment to adapt itself to scoop up materials disposed in any manner.

Further important objects of this invention are to provide a device of the type stated, in a manner as hereinafter set forth, which is simple in its construction and arrangement, strong, durable and efficient in its use, substantial, compact and quick-acting and comparatively inexpensive to manufacture.

With the foregoing and other objects in view, which will appear as the description proceeds, the invention resides in the combination and arrangement of parts and in the details of construction hereinafter described and claimed, it being understood that changes in the precise embodiment herein disclosed can be made without departing from the principle of the invention, which come within the scope of the claims hereunto appended.

In the drawings forming a portion of this specification and wherein like numerals of reference designate corresponding parts throughout the several views:

Figure 3 is a top plan view of the guide block carried at the forward end of the boom.

Figure 4 is a view on line IV—IV, Figure 3.

Figure 5 is an enlarged detail perspective view of associated parts forming the attachment of the bucket with the carrier.

Figure 6 is a sectional side view of the bucket attachment elements.

Figure 1:
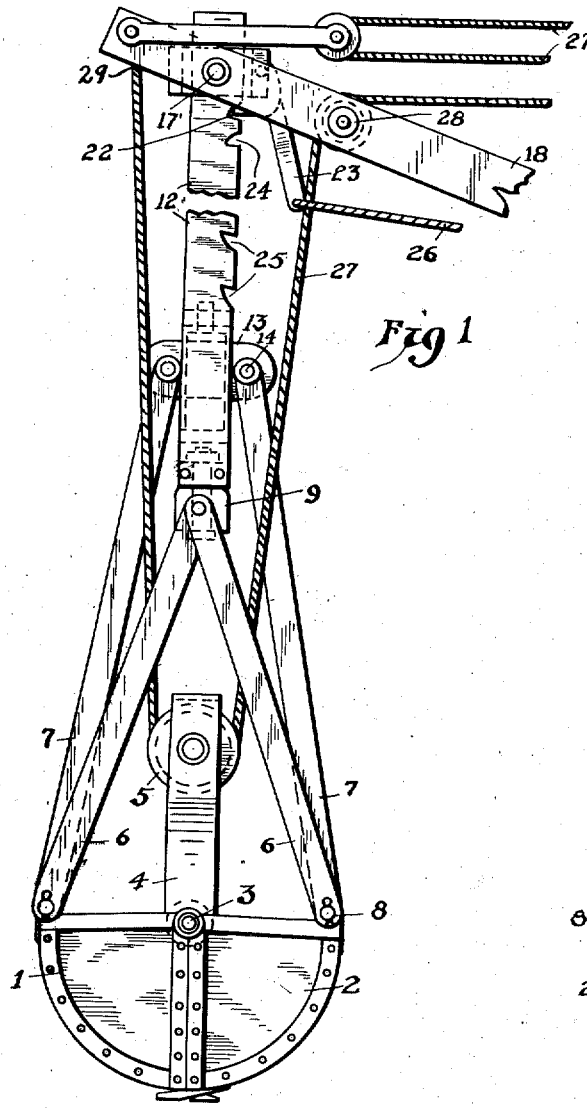
Figure 1 is a side elevation of a bucket and operating mechanism for power excavators and loaders in accordance with this invention.
Figure 2:
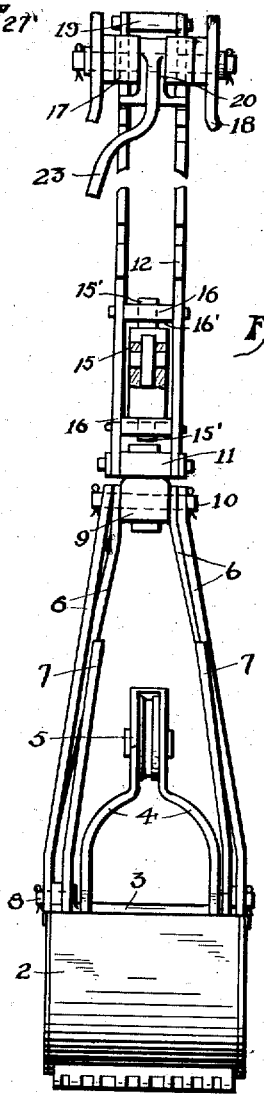
Figure 2 is a front view thereof.

Referring in detail to the drawing 1 and 2 denote respective bucket members of the "clam shell" type, having the upper ends of adjoining side walls hingedly connected together by a transversely disposed shaft 3. A hanger 4 is mounted on the shaft 3 and carries the pulley 5 rotatably mounted therein.

Each outer corner of the bucket members 1 and 2 is pivotally attached to a pair of hanger arms 6 and 7 by a common connecting pin 8. The hanger arms 6 at each side of the bucket members 1 and 2 have their upper converging ends pivotally connected to respective sides of a swivel block 9, on integrally formed lateral projections 10. The block 9 is swivelly connected in a spacer 11 fixedly mounted between the lower end of a carrier 12.

The hanger arms 7 are of a greater length than the hanger arms 6. The hanger arms 7 at each side of the bucket members 1 and 2 have their upper ends pivotally connected to respective sides of a transverse bar 13 by means of pins 14. The bar 13 extends through and is fixed in a vertically disposed bearing 15 and has upper and lower reduced ends 15′ which are pivoted in respective bearing brackets 16 secured intermediate of the carrier 12, with clearance 16′ to also allow a slight vertical movement of the bearing 15.

The pivoted connections of the hanger arms 6 and 7, together with the clearance 16′ provided for the latter, allow their movement to permit of the opening and closing of the bucket members 1 and 2, during the dumping and filling operations.

A guide block 17 is pivotally mounted as at 17′ adjacent to the forward end of the boom 18 and provides a guide for the carrier 12 extending therethrough. The boom 18 is pivoted on a frame (not shown) and is adapted to be raised or lowered during excavating operations by cable 27′ operated in a known manner. The carrier 12 includes two members spaced relatively to each other by a spacer 19 positioned between the upper end of the carrier members 12.

A lock 20 is pivotally connected, as at 21, to the rear end of the guide block 17 and carries a pair of forwardly projecting latches 22, fixed to the lower end thereof. An angularly disposed and depending operating arm 23 is fixed to and counterbalances the lock 20 and its disposition normally causes the lock 20 to swing forwardly by gravity against the carrier 12.

The inner edges of the carrier members 12 are formed with a plurality of notches 24, which extend along the upper portion thereof, and a plurality of notches 25 are also formed on the inner edges of the carrier members 12 arranged along the lower portion thereof. The notches 24 are arranged in pairs, that is, a notch 24 on one of the carrier members 12 is transversely aligned with a corresponding notch 24 on the other of said carrier members 12. The notches 25 at the lower portion of the carrier 12 are similarly positioned.

It will be noted that the notches 25 have a straight upper wall and a curved lower wall, while the notches 24 are reversed having a straight lower wall and a curved upper wall. This formation of the notches 24 and 25 is provided to permit of their proper engagement by the latches 22 carried by the lock 20.

When the upper end of the carrier 12 is lowered into engagement with the boom 18, the latches 22 will be in engagement with a pair of the notches 24, and owing to their formation the weight of the boom 18 may be applied to the carrier forcing the bucket members 1 and 2 into the material to be conveyed.

By manipulation of the line 26 secured to the lower end of the operating arm 23 the latches are released from the notches 24 and the bucket elevated to the boom 18 by the operation of the cable 27. After the bucket has been elevated the latches will automatically engage in a pair of notches 25, and maintain the bucket in such elevated position while the latter is conveyed and dumped by the release of the cable 27.

Thus a rigid connector is provided between the boom and the bucket to facilitate digging at great depths, which connector is, however, shiftable to carry the bucket up to the boom, thus providing a high dumping elevation.

After the dumping operation the latches 22 are released from the notches 25 by a pull on the line 26, allowing the vertical shifting of the carrier in the guide block 17.

The bucket members 1 and 2 are actuated by the operation of the cable 27. The latter passes from its operating drum (not shown) over the sheave 28, rotatably mounted on the boom 18, around the pulley 5 and has its end secured, as at 29 to the forward end of the boom 13.

The bucket members 1 and 2, due to their construction and hinged connection, normally shift to the open position, when the cable 27 is slacked. The bucket is filled by drawing the members 1 and 2 to the closed position, such closing operation being accomplished by winding the cable 27 upon its drum. The cable 27 is held taut until the bucket has been conveyed to the dumping position. Upon release of the cable 27 the bucket members 1 and 2 will automatically open and discharge the contents thereof.

During the filling operation the weight of the boom 18 may be thrown upon the bucket while the cable 27 is operating to draw the members 1 and 2 to the closed position, thereby assuring a more nearly capacity load at all times. The pivotal connections of the hanger arms 6 and 7 with the bucket permit of the partial rotation of the latter to allow for its adjustment to scoop up a full load regardless of the position of materials in which it is operating.

What I claim is:

1. An operating mechanism for excavator grab buckets comprising a bucket carrier, means for swivelly connecting a bucket therewith, said carrier being shiftable lengthwise in the outer end of the boom of the excavator, said boom and carrier having inter-engaging means for utilizing the weight of the boom on the bucket to facilitate the filling of the bucket, said interengaging means including a shiftable member.

2. An operating mechanism for excavator grab buckets comprising a bucket carrier, means for swivelly connecting a bucket therewith at two points thereof, said carrier being shiftable lengthwise in the outer end of the boom of the excavator, said boom and carrier having inter-engaging means for utilizing the weight of the boom on the bucket to facilitate the filling of the bucket, said inter-engaging means including a shiftable member.

3. An operating mechanism for excavator grab buckets comprising a bucket carrier, means for swivelly connecting a bucket to the lower end and intermediate the ends of said carrier at two points thereof, said carrier being shiftable lengthwise in the outer end of the boom of the excavator, said boom and carrier having inter-engaging means for utilizing the weight of the boom on the bucket to facilitate the filling of the bucket, said inter-engaging means including a shiftable member.

4. An operating mechanism for excavator grab buckets comprising a bucket carrier, means for swivelly connecting a bucket therewith, said carrier being shiftable lengthwise in the end of the boom of the excavator, said boom and carrier having inter-engaging means for utilizing the weight of the boom on the bucket to facilitate the filling of the bucket, said inter-engaging means including a shiftable member, said member being counter-balanced and an operating element for said member to selectively position the same with respect to the carrier.

5. An operating mechanism for excavator grab buckets comprising a bucket carrier, means for swivelly connecting a bucket thereto at two points thereon, said carrier being shiftable lengthwise in the end of the boom of the excavator, said boom and carrier having inter-engaging means for utilizing the weight of the boom on the bucket to facilitate the filling of the bucket, said inter-engaging means including a shiftable member, said member being counter-balanced, and on operating element for said member to selectively position the same with respect to the carrier.

6. An operating mechanism for excavator grab buckets comprising a bucket carrier, means for swivelly connecting a bucket to the lower end and intermediate of the ends of said carrier at two points thereon, said carrier shiftable lengthwise in the end of the boom of the excavator, said boom and carrier having inter-engaging means for utilizing the weight of the boom on the bucket to facilitate the filling of the bucket, said inter-engaging means including a shiftable member, said member counter-balanced, and an operating element for said member to selectively position the same with respect to the carrier.

7. An operating mechanism for excavator grab buckets comprising a bucket carrier, four pairs of hanger arms adapted to be connected at their lower ends to the bucket, the arms of two pairs being of less length than the arms of the other two pairs, superposed swivel elements for connecting said arms with said carrier, said carrier being shiftable lengthwise in the end of the boom of the excavator, said boom and carrier having inter-engaging means for utilizing the weight of the boom on the bucket to facilitate the filling of the bucket, said inter-engaging means including a shiftable member.

8. An operating mechanism for excavator grab buckets comprising a bucket carrier, four pairs of hanger arms adapted to be connected at their lower ends to the bucket, the arms of two pairs being of less length than the arms of the other two pairs, superposed swivel elements for connecting said arms to said carrier, said carrier being shiftable lengthwise in the end of the boom of the excavator, said boom and carrier having inter-engaging means for utilizing the weight of the boom on the bucket to facilitate the filling of the bucket, said inter-engaging means including a shiftable member, and an operating element for said member to selectively position the same with respect to the carrier.

9. An operating mechanism for excavator grab buckets comprising a bucket carrier, four pairs of swivelled elements depending from said carrier for connecting a bucket thereto, two pairs of said elements extending above the other, said carrier being shiftable lengthwise of the boom of the excavator, and means for positioning the carrier at different points with respect to the ends of the boom for utilizing the weight of the boom on the bucket to facilitate the filling thereof.

10. An operating mechanism for excavator grab buckets comprising a bucket carrier, four pairs of swivelled elements depending from said carrier for connecting a bucket therewith, two pairs of said elements extending above the other, said carrier being shiftable lengthwise of the boom of the excavator, and means for positioning the carrier at different points with respect to the end of the boom for utilizing the weight of the boom on the bucket to facilitate the filling thereof, an operating element for said means for selectively positioning the same, and operating means for the boom.

11. An operating mechanism for the purpose set forth comprising a vertically disposed carrier shiftable lengthwise in the outer end of the boom of the excavator, means for detachably connecting the boom to the carrier at different points throughout the length of the latter, superposed swivel-devices secured to the carrier, and two pairs of bucket hanger arms connected to each of said devices.

12. An operating mechanism for the purpose set forth comprising a vertically disposed carrier, shiftable lengthwise in the outer end of the boom of the excavator, means for detachably connecting the boom to the carrier at different points throughout the length of the latter, superposed swivel-devices secured to the carrier, and two pairs of bucket hanger arms connected to each of said devices, operating means for the boom, and means for elevating the carrier with respect to the boom.

13. An operating mechanism for the purpose set forth comprising a bucket, a carrier, hanger arms for the bucket, means for swivelly connecting said arms to the carrier, said carrier being shiftable lengthwise in the outer end of the boom of the excavator, and means for connecting the boom to the carrier at different points with respect to the length of the latter.

14. An operating mechanism for the purpose set forth comprising a bucket, a carrier, hanger arms for the bucket, means for swivelly connecting said arms to the carrier at its ends and intermediate its ends, said carrier being shiftable lengthwise in the outer end of the boom of the excavator, and means for detachably connecting the carrier to the boom at different points on the carrier.

15. An operating mechanism for the purpose set forth comprising a bucket, a carrier, hanger arms for the bucket, means for swivelly connecting said arms to the carrier, said carrier being shiftable lengthwise in the boom of the excavator, and means for detachably connecting the boom to the carrier at different points with respect to the length of the latter, operating means for said boom for transporting the bucket to and from dumping position, and an operating element for the means for detachably connecting the boom with the carrier.

16. An operating mechanism for the purpose set forth, comprising a bucket, a carrier, hanger arms for the bucket, means for swivelly connecting said arms to the carrier at its ends and intermediate of its ends, said carrier being shiftable lengthwise in the boom of the excavator, and means for detachably connecting the boom to the carrier at different points with respect to the length of the latter, operating means for said boom for transporting the bucket to and from dumping position, and an operating element for the means for detachably connecting the boom with the carrier.

17. An operating mechanism for the purpose set forth comprising the combination with a scoop of the grab bucket type and a boom shifted carrier provided with a pair of superposed swivel devices, of two pairs of hanger arms extended upwardly from the scoop and connected to one of the said devices, and two pairs of hanger arms extended upwardly from the scoop and connected to the other of said devices.

18. An operating mechanism for the purpose set forth comprising a vertically disposed shiftable carrier provided with a swivel device at its lower end and a swivel device intermediate its ends, a scoop, two pairs of hanger arms extended upwardly from the scoop and pivotally connected to said lower swivel device and two pairs of hanger arms extended upwardly from the scoop and pivotally connected to the upper swivel device.

19. An operating mechanism for the purpose set forth comprising a vertically disposed shiftable carrier having one side thereof provided with two sets of superposed notches with the notches of each set arranged in transverse alignment with respect to the carrier, a scoop suspension means depending from the carrier, said carrier being shiftable lengthwise of the boom and means carried by the boom and engageable with the notches of one set for utilizing the weight of the boom to facilitate the filling operation of the scoop and engageable in the other set provided for maintaining the scoop in elevated position during the dumping operation.

20. An operating mechanism for the purpose set forth comprising a vertically disposed shiftable carrier having one side thereof provided with two sets of superposed notches, with the notches of each set arranged in transverse alinement with respect to the carrier, the notches of one set being oppositely disposed with respect to the notches of the other set, a scoop suspension means depending from the carrier, said carrier being shiftable lengthwise of the boom, and means carried by the boom and engageable with the notches of one set for utilizing the weight of the boom to facilitate the filling operation of the scoop and engageable in the other set for maintaining the scoop in the elevated position during the dumping operation, an operating element for said means, and means for shifting the boom.

21. An operating mechanism for the purpose set forth comprising a vertically disposed shiftable carrier having one side thereof provided with two sets of superposed notches with the notches of each set arranged in transverse alinement with respect to the carrier, the notches of one set being oppositely disposed with respect to the notches of the other set, a scoop suspension means depending from the carrier, said carrier shiftable lengthwise of the boom, and means carried by the boom and engageable with the notches of one set for utilizing the weight of the boom to facilitate the filling operation of the scoop and engageable in the other set for maintaining the scoop in elevated position during the dumping operation, and means connected with the scoop and boom for elevating the carrier.

LE ROY P. CLUTTER.